US011273336B2

(12) United States Patent
Böke et al.

(10) Patent No.: US 11,273,336 B2
(45) Date of Patent: Mar. 15, 2022

(54) DEVICE FOR MONITORING A STORAGE HEIGHT

(71) Applicant: Minimax Viking Research & Development GmbH, Bad Oldesloe (DE)

(72) Inventors: Joachim Böke, Düsseldorf (DE); Frank Friede, Groß Neuleben (DE); Stephan Bludau, Elmenhorst (DE)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 0 days.

(21) Appl. No.: 16/912,675

(22) Filed: Jun. 25, 2020

(65) Prior Publication Data

US 2021/0001160 A1 Jan. 7, 2021

(30) Foreign Application Priority Data

Jul. 5, 2019 (DE) ...................... 10 2019 118 192.5

(51) Int. Cl.
*A62C 3/00* (2006.01)
*G08B 17/107* (2006.01)
*B65G 1/04* (2006.01)

(52) U.S. Cl.
CPC ............ *A62C 3/002* (2013.01); *G08B 17/107* (2013.01); *B65G 1/0421* (2013.01)

(58) Field of Classification Search
CPC .................................................... A62C 3/002
See application file for complete search history.

(56) References Cited

U.S. PATENT DOCUMENTS

| 10,796,545 B2 * | 10/2020 | Nassar ................... H04N 7/181 |
| 2010/0194574 A1 | 8/2010 | Monk et al. |
| 2011/0036598 A1 | 2/2011 | Pahila |

(Continued)

FOREIGN PATENT DOCUMENTS

| EP | 2178035 | 4/2010 |
| EP | 2322250 | 5/2011 |

OTHER PUBLICATIONS

Minimax GmbH, "Inveron Hazard Management System" Brochure, German and English version, (2017), 16 pages.

*Primary Examiner* — Travis R Hunnings
(74) *Attorney, Agent, or Firm* — Perkins Coie LLP

(57) ABSTRACT

The present invention comprises a device (1100) for monitoring a storage height (2100) of a warehouse (2000), in particular a shelf warehouse, preferably a high-bay warehouse, comprising at least: a sensor (1110) that is in particular designed to be arranged in an upper region of the warehouse (2000), wherein the sensor (1110) is configured so as to: perform a distance measurement ($D_i$, $D_N$) of a distance ($D_i$, $D_N$) that is substantially horizontal with respect to the warehouse (2000) and that monitors a predefined maximum storage height (2120), and a measurement and/or control unit (1120) that is configured so as to output a message (F, W) in the event of an exceedance (Ü) of the predefined maximum storage height (2120) being detected by the sensor (1110).

21 Claims, 3 Drawing Sheets

(56) References Cited

U.S. PATENT DOCUMENTS

2016/0253885 A1* 9/2016 Nassar .................. G01V 15/00
                                                340/572.1
2017/0200358 A1   7/2017 Fang et al.
2017/0249817 A1* 8/2017 Nassar .................. G01V 15/00
2019/0020191 A1* 1/2019 Charneco Fern Nndez ................
                                                H02H 5/12

* cited by examiner

DEVICE FOR MONITORING A STORAGE HEIGHT

PRIORITY CLAIM AND INCORPORATION BY REFERENCE

This application claims the benefit of German Application No. 10 2019 118 192.5 filed Jul. 5, 2019, which application is incorporated by reference in its entirety.

TECHNICAL FIELD

The present invention relates to a device for monitoring a storage height and to a firefighting system comprising such a device.

BACKGROUND AND SUMMARY OF THE INVENTION

In the storage sector, stored goods, that is to say materials of all kinds, are usually accommodated in warehouses in a free-standing manner or on shelves.

It may be the case here that the stored goods are accommodated in the warehouse or on the shelf such that they prevent effective firefighting, if for example boxes are stacked up underneath a sprinkler to such a height that said sprinkler is restricted in terms of its firefighting property.

In order to counter such incorrect loading, the warehouse is usually inspected by the warehouse operator by eye, mostly at irregular time intervals.

This may however lead to a situation whereby, in spite of all due care taken by the operator, a fire breaks out in the warehouse while some stored goods are stacked, in particular stacked to an excessive height, such that they prevent effective firefighting. As a result of the permissible storage height being exceeded (Ü), the fire load is in particular increased and firefighting is prevented, and the required amount of extinguishing agent is in particular no longer sufficient.

The object of the present invention is therefore to address one of the above-mentioned problems, to improve the general prior art or to provide an alternative to what is already known. The intention is in particular to provide automated, effective storage height monitoring.

According to the invention, what is thus proposed is a device for monitoring a storage height of a warehouse, in particular a shelf warehouse, preferably a high-bay warehouse, comprising at least a sensor that is in particular designed to be arranged in an upper region of the warehouse, wherein the sensor is configured so as to perform a distance measurement of a distance that is substantially horizontal with respect to the warehouse and that monitors a predefined maximum storage height, and a measurement and/or control unit that is configured so as to output a message in the event of an exceedance (Ü) of the predefined maximum storage height being detected by the sensor.

What is thus proposed is a device that has at least a sensor and a measurement and/or control unit. The warehouse itself may be for example a free-standing warehouse, a pallet shelf warehouse, a single-row or multi-row standing warehouse or the like and comprise for example closed or slatted intermediate shelves.

The sensor is thus in particular configured so as to perform a distance measurement of a distance that is substantially horizontal with respect to the warehouse and that monitors a predefined maximum storage height.

The sensor is thus in particular configured so as to monitor a specific, specifically a predefined maximum storage height in the warehouse itself or on a shelf of the warehouse.

The predefined maximum storage height may also be referred to as permissible storage height. The predefined maximum storage height may however for example relate to a shelf or a storage bay; by way of example, a shelf having five bays that each have a height of 1 meter, wherein the predefined maximum storage height for the storage bay is in the region of for instance 0.5 to 0.9 meters, preferably 0.8 meters, depending on the type and structure of the extinguishing apparatus, for example the sprinkler, the sprinkler structure or type of sprinkler and shelf structure. The predefined maximum storage height thus results essentially from a required (vertical) distance from an extinguishing apparatus, for example a sprinkler.

It should in particular be borne in mind that the following clearances should be maintained below the spray plates of for example roof and ceiling sprinklers:
 approx. 0.5 meters in LH and OH systems, except for in the case of suspended, open ceilings
 approx. 0.8 meters in the case of suspended, open ceilings in LH and OH systems
 approx. 1 meter in HHP and HHS systems.

In the case of the shelf sprinklers, the vertical distance between the sprinkler spray plate and the upper edge of the stored goods should be at least 150 mm, and when using flat panel sprinklers the distance may be reduced further, for example to approx. 100 mm.

The abovementioned abbreviations such as LH, OH, HHS and HHP relate to fire hazard classes and each mean:
 LH=Light Hazard (for example offices)
 OH=Ordinary Hazard (for example mixed production and warehouse areas)
 HHS=High Hazard Storage (for example pure warehouse areas)
 HHP=High Hazard Production (for example pure production areas).

The storage height may for example by monitored by suspending the sensor from the warehouse ceiling or arranging it above the stored goods on the shelf, specifically preferably at a predefined maximum storage height.

The sensor may also be attached to a wall of the warehouse, from which it is possible to monitor the predefined maximum storage height.

The predefined maximum storage height is in this case selected such that there is no chance of impairing firefighting within the warehouse, for example 0.5 meters or 0.8 meters or 1.0 meter below a sprinkler, in particular the spray plate thereof. This distance may for example vary depending on the type of extinguishing apparatus or the fire hazard class. Thus, 1 meter is for example conceivable in HSS systems, and 0.15 meters is conceivable for example in the case of shelf sprinklers.

The predefined maximum storage height may in this case be monitored by way of lasers, sound, radar or similar sensor technologies that are designed to sense or to measure a horizontal distance.

The device furthermore has a measurement and/or control unit that is configured so as to output a message in the event of an exceedance (Ü) of the predefined maximum storage height being detected by the sensor.

The sensor thus senses for example that the predefined maximum storage height has been exceeded and forwards this or a value that indicates this to the measurement and/or control unit. The measurement and/or control unit in turn converts the signal from the sensor into a message, for example into a warning message, that may be used to trigger an alarm in the warehouse hall.

The sensor is preferably configured so as to perform a laser distance measurement.

The sensor is thus preferably designed as a laser sensor, for example as a rotation sensor or linear sensor.

A high measurement accuracy and the possibility of performing a distance measurement over long distances are particularly advantageous in the case of laser sensors.

This is particularly advantageous in expansive high-bay warehouses.

In the case of linear sensors, a multiplicity of such sensors should furthermore be arranged in the warehouse such that they span a network that substantially completely monitors the warehouse.

It is also conceivable to use a laser sensor whose laser beam is routed around the sensor by way of a mirror. The laser sensor may optionally be provided on a movable rail or on a movable object (for example a drone).

The sensor is preferably a rotation sensor.

One particular advantage in this case is for example that only one sensor needs to be arranged centrally in the room in the case of small warehouses.

In the case of expansive warehouses, however, it may be expedient to use or to install a plurality of such rotation sensors.

The sensor preferably has at least a vertical axis (V) and is furthermore configured so as to perform a rotational movement (R) of at least 90°, preferably at least 180°, particularly preferably at least 360° about the vertical axis (V).

The sensor is thus in particular configured so as to rotate about its or an axis of rotation. By way of example, if the sensor is arranged on a wall, then at least 180° would be desirable. In the event that the sensor is arranged in the middle of the room, at least 360° would be desirable.

The sensor is particularly preferably configured so as to rotate multiple times about its own axis.

To this end, the sensor may for example contain slip rings that allow signals to be transmitted from the sensor head to the measurement and/or control unit.

The fact that there is no chance of twisting of any cable is particularly advantageous in this case.

The sensor preferably has at least a vertical axis (V) and is furthermore configured so as to perform a rotational movement (R) about the vertical axis (V) at a predetermined rotational speed, and the rotational speed is for instance in the range from 1 to 90 revolutions per minute.

The sensor is thus in particular configured so as to rotate completely about its own axis at least within 10 seconds and at the same time to perform a multiplicity of distance measurements, for example every 0.5°.

In one particularly preferred embodiment, the rotational speed of the sensor is settable, for example between 360° per 60 seconds and 360° per 2 seconds.

The sensor may particularly preferably be parameterized with a settable sampling rate; for example measurements every 5° in the case of 1 revolution per minute.

The measurement and/or control unit is preferably furthermore configured so as to provide a timestamp associated with the message (F, W) in the event of an exceedance (Ü) of the predefined maximum storage height being detected by the sensor.

The measurement and/or control unit is thus in particular configured so as to allocate a timestamp to each detected exceedance (Ü).

As a result, it is possible for example to differentiate the message from the sensor on the basis of the timestamp, for example as a fault message or as a warning message.

If for example the sensor detects an exceedance (Ü) at a first time and no longer detects it at a second time, for example 5 seconds later, then it may be assumed that this is just a short-term exceedance (Ü) of the predefined maximum storage height, for example the fact that a fork-lift truck has driven through the distance measurement. In this case, for example, a fault message may then be stored in a memory that logs a short-term fault with the distance measurement.

In another case, if the sensor detects an exceedance (Ü) at a first time and also at a second time, for example 10 seconds later, then it may be assumed that stored goods have been arranged in the warehouse such that they exceed the predefined maximum storage height and effective firefighting is thus no longer possible. In this case, a warning message may then for example be triggered, this being able to be used to trigger an acoustic and/or optical alarm in the warehouse that indicates that the permissible storage height has been exceeded.

In one particularly preferred embodiment, positions, such as for example angles of rotation, are also stored in a register of the measurement and/or control unit for this purpose.

It is thereby possible for warehouse staff to be able to establish, by reading a register, for example on a screen of the device according to the invention on the screen connected thereto, whether and/or where and/or when and/or how the permissible storage height has been exceeded (Ü).

The device preferably has a register connected to the measurement and/or control unit and that is designed to store data sensed by the sensor, in particular in order to initialize the device for the first time within the warehouse and furthermore or as an alternative to compare a current distance with a previous distance and furthermore or as an alternative with an initialized distance.

It is thus in particular proposed to compare an actual value with a setpoint value and to establish a fault and in particular incorrect loading of the warehouse in the event of a deviation.

The device thus also comprises a register that is connected to the measurement and/or control unit and may preferably be part of the measurement and/or control unit. The register may furthermore be provided in the device for monitoring a storage height or externally, for example on a cloud.

The register is in this case in particular designed to store a wide variety of values for predetermined distances and under some circumstances to compare them with the additional assistance of a computing unit, a processor of a computer, etc., for example using angles of rotation and timestamps.

The register is preferably furthermore initialized in a first step, in particular in an exempted and/or permissibly stacked warehouse.

The device is thereby in particular configured so as to distinguish between brief faults that are caused for example by fork-lift trucks driving through the warehouse and incorrect loading of the warehouse, that is to say excessively high loading of a shelf.

The measurement and/or control unit is preferably furthermore configured so as to trigger an alarm by way of the register, in particular by way of an (optional) alarm unit present in the warehouse, for example a flashing light, and/or to output a signal, for example a data signal, to an external device in a wired or wireless manner, for example.

The measurement and/or control unit may thus in particular establish excessively high loading of the warehouse by way of a data comparison with the register.

The alarm that is triggered by the measurement and/or control unit may in this case be optical and/or acoustic.

For example by way of a flashing light that is arranged in the warehouse.

The device preferably furthermore comprises an optical alarm unit, in particular a flashing light, that is configured so as to output a message, preferably a warning message, from the measurement and/or control unit, within a warehouse in the form of an optically visible alarm.

The device thus in particular comprises a flashing light that may output for example a flashing red light in the warehouse.

The device according to the invention preferably furthermore comprises an interface that is configured so as to exchange data between the measurement and/or control unit and a hub, wherein the interface is preferably designed as a communication unit that is configured so as to transmit signals to a computer or to a cloud server, preferably to a mobile terminal of a warehouse worker.

Where reference is made to a hub in the present application, this should be understood to mean inter alia also a sprinkler monitoring hub and/or a fire detector hub and/or an extinguishing control hub and/or a fault message hub and deviations therefrom.

The device according to the invention, in addition to the measurement and control unit, preferably furthermore comprises a communication unit that is configured so as to transmit data to a further apparatus, in particular a hub and/or a computer and/or a cloud server and/or a mobile terminal.

The device according to the invention thus in particular comprises an interface, for example a data bus, by way of which the device is able to communicate with other fire protection apparatuses, such as for example a sprinkler monitoring hub or a fire detector and/or extinguishing control hub.

The interface may however also be designed as a communication unit that is configured for example so as to receive the data from the measurement and/or control unit and to forward them or a signal resulting therefrom to a third party. The third party may be for example the sprinkler monitoring hub (or another hub) or an external remote monitoring system, such as for example a cloud, a cloud server or a computer. The cloud or the cloud server, for example the data, information, etc. stored there, may in turn preferably be retrieved and called by way of a mobile telephone. The communication unit is thus also configured so as to transmit an alarm or incorrect loading of the warehouse to a cloud, a cloud server, a computer or a mobile telephone, for example of a warehouse worker.

A communication unit may in this case use various transmission paths and means, for example a cable, a radio module (LORA, ISM-Band 433 MHz Region 1 and/or SRD-Band 868 MHz Europe). A communication unit may thus also be a cable or a transmission module in which the data should be transmitted to a desired terminal, a destination address or the like.

The device preferably furthermore comprises a computer program product able to be executed by the measurement and/or control unit and that comprises commands that, when they are executed on a computer, prompt the sensor to perform the distance measurement and to differentiate a detected exceedance (Ü) using at least two timestamps, in particular as a fault message and a warning message.

The device thus also comprises software that is able to be executed for example by the measurement and/or control unit or another computer that is part of the device.

This software may be used to move the sensor, for example to rotate and/or set it, and furthermore or as an alternative to differentiate whether the measurement of the sensor is disrupted only briefly, for example due to a fork-lift truck driving through the warehouse, or incorrect loading of the warehouse, in particular excessively high loading of a shelf, is present.

The sensor in this case performs a corresponding measurement at predetermined intervals, said measurement then being evaluated accordingly.

When the sensor is designed as a rotation sensor, the sensor may in this case be designed to rotate continuously or in a predetermined interval, or be triggered manually, for example by operating staff in the warehouse.

According to the invention, what is furthermore proposed is a firefighting system, in particular a water extinguishing system for a warehouse, wherein the firefighting system comprises at least one extinguishing fluid outlet, in particular a nozzle and/or a sprinkler or an above-described device for monitoring storage height.

The warehouse may preferably a free-standing warehouse, a pallet shelf warehouse, a single-row or multi-row standing warehouse or the like and comprises for example closed or slatted intermediate shelves.

In one preferred embodiment, the firefighting system is a sprinkler system.

More preferably, the sensor of the device according to the invention is then arranged outside the projection cone(s) of the sprinkler(s) of the sprinkler system.

The firefighting system preferably comprises a hub that is connected to devices according to the invention as described above or below in order to trigger an alarm, a warning or the like, in particular by way of a flashing light.

As mentioned, the hub may be designed as a sprinkler monitoring hub and/or fire detector hub and/or extinguishing control hub and/or fault message hub.

The described alarm may in this case also be an optical or acoustic or haptically perceptible fault/warning.

According to the invention, it is furthermore proposed to use the device for monitoring a storage height of a warehouse as described above or below in a firefighting system.

Finally, what is proposed is the hub of a firefighting system that is assigned to the device described above according to the invention, in order, if necessary, for example when an exceedance Ü of the predefined maximum storage height is detected, to output a message or an alarm or a fault or a warning or the like via a corresponding display means.

A hub of a firefighting system as described according to the invention, wherein the hub is assigned a device as described according to the invention.

BRIEF DESCRIPTION OF THE DRAWINGS

The present invention will now be explained in more detail below by way of example on the basis of exemplary embodiments with reference to the accompanying figures, the same reference signs being used for functionally identical components.

MODE(S) FOR CARRYING OUT THE INVENTION

Figure 1:
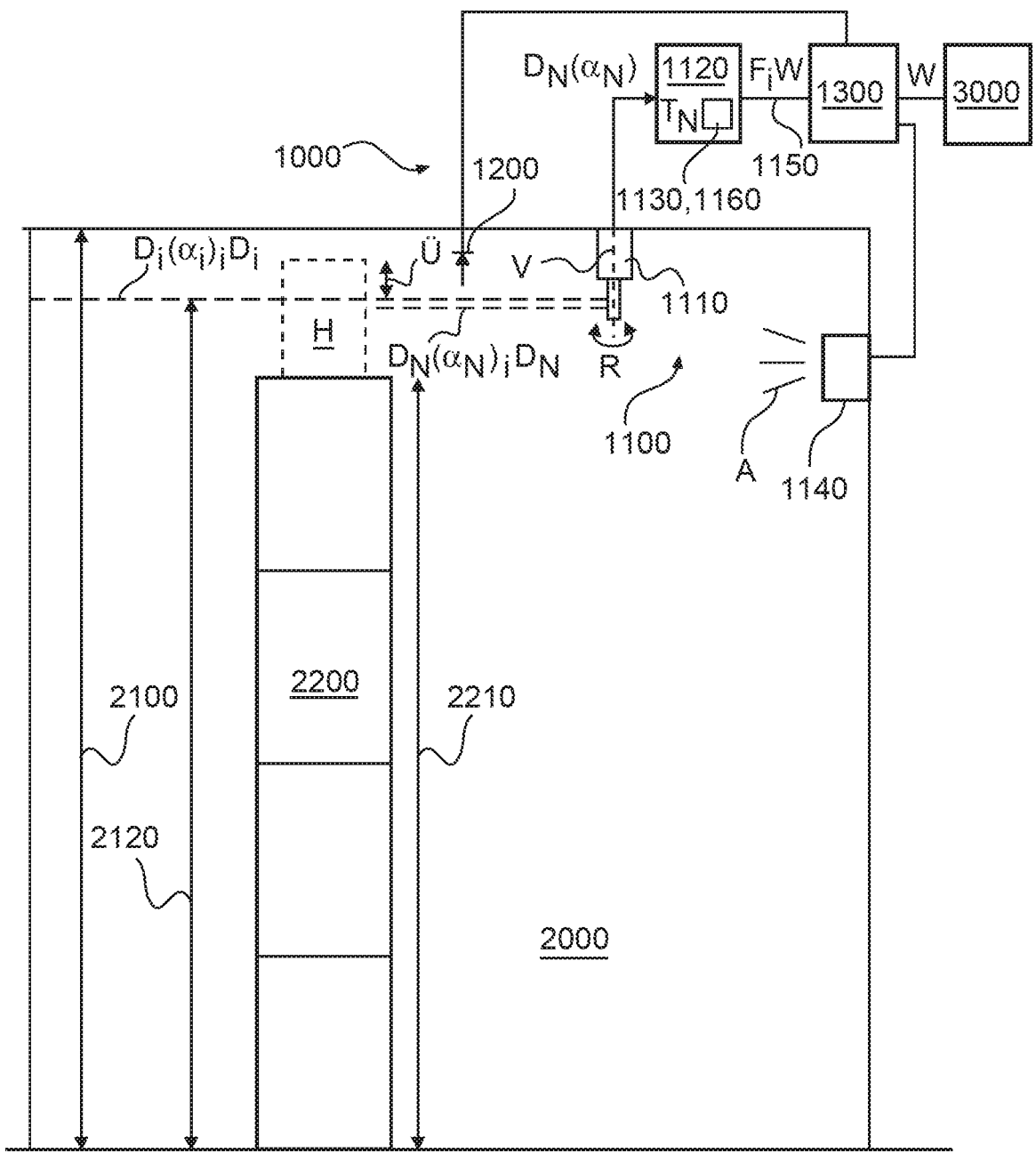
FIG. 1 shows a schematic view of a firefighting system according to the invention comprising a device for monitoring a storage height of a warehouse according to the invention.

FIG. 1 shows a schematic view of a firefighting system 1000 according to the invention comprising a device 1100 for monitoring a storage height of a warehouse 2000 according to the invention, wherein the warehouse 2000 has a maximum storage height 2100 and a predefined maximum storage height 2120 and furthermore comprises a shelf 2200 with a shelf height 2210.

The maximum storage height 2100 is structurally defined and is governed by the design of the warehouse 2000, in particular the ceiling height or shelf height of the warehouse.

The predefined maximum storage height 2120 is governed by the design of the extinguishing system, in particular the sprinkler 1200.

The predefined maximum storage height 2120 is usually between the maximum storage height 2100 and the shelf height 2210, wherein the shelf height 2210 is less than the maximum storage height 2100.

The firefighting system 2000 in this case essentially comprises the device 1100 for monitoring a storage height, a sprinkler 1200 and a hub 1300. The hub 1300 is preferably designed as a sprinkler monitoring hub that is connected to a fire detector and/or extinguishing control hub 3000. It is however also possible for the firefighting system 2000 to be connected directly to a cloud server.

The device 1100 for monitoring the storage height comprises a rotation sensor 1110, a measurement and/or control unit 1120, a register 1130, a flashing light 1140, an interface 1150 and a computer program product 1160.

The rotation sensor 1110 is configured so as to be arranged in an upper region of the warehouse 2000, that is to say for example below a warehouse ceiling or above the shelf 2200 or above the shelf height 2210.

Figure 2:
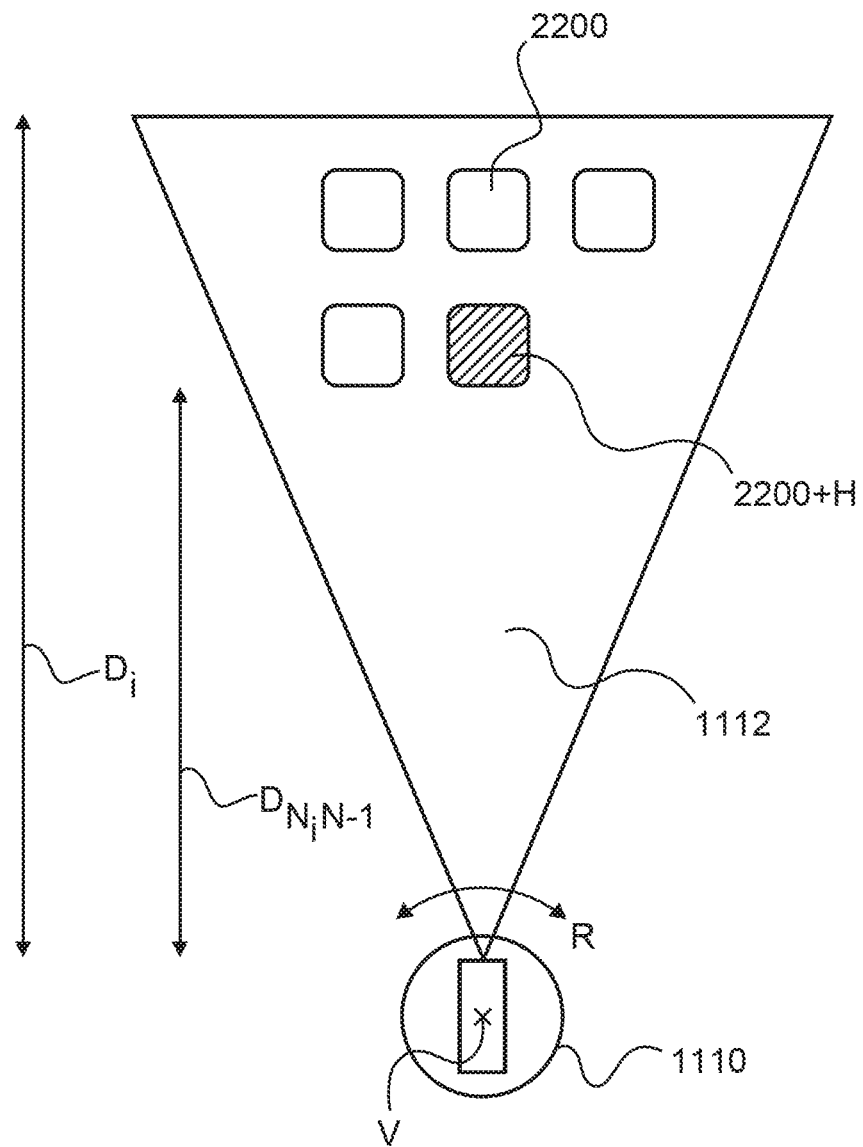
FIG. 2 shows a schematic plan view of a sensor of a device for monitoring a storage height of a warehouse according to the invention, and FIG. 3 schematically shows a mode of operation of the measurement and/or control unit of a device for monitoring a storage height according to the invention, in particular the comparison of two distance measurements.

The rotation sensor 1110 is furthermore configured so as to operate with a laser distance measurement and to perform a distance measurement $Di(\alpha i)$, $DN(\alpha N)$ of a distance Di, DN that is substantially horizontal with respect to the warehouse 2000 and that monitors a predefined maximum storage height 2120, in particular as shown in FIG. 2.

To this end, the rotation sensor 1110 has at least a vertical axis (V) and is furthermore configured so as to perform a rotational movement (R) of at least 360° about the vertical axis (V).

The rotation sensor 1110 is thus configured so as to survey the entire warehouse 2000 in a plane in which the distance measurement $Di(\alpha i)$, $DN(\alpha N)$ is performed.

In one preferred embodiment, the rotation sensor 1110 has for example at least a rotational speed of 360° per 10 seconds.

The measurement and/or control unit 1120 is furthermore configured so as to output a message F, W in the event of an exceedance (Ü) of the predefined maximum storage height 2120 being detected by the rotation sensor 1110.

To this end, the measurement and/or control unit 1120 is likewise configured so as to provide a timestamp TN associated with the message F, W in the event of an exceedance (Ü) of the predefined maximum storage height 2120 being detected by the rotation sensor 1110.

The measurement and/or control unit 1120 is furthermore connected to the register 1130, which is designed to store data sensed by the rotation sensor 1110, in particular in order to initialize the device for the first time within the warehouse and furthermore or as an alternative to compare a current distance DN with a previous distance DN-1 and furthermore or as an alternative with an initialized distance Di. One possibility for this comparison is explained below with reference to FIG. 3.

The measurement and/or control unit 1120 is additionally connected directly or indirectly to the sprinkler monitoring hub 1300, and thus to the flashing light 1140, via the interface 1150 in order to trigger an optical alarm A.

The flashing light 1140 is thus also at least configured so as to output a message F, W, preferably a warning message W, from the measurement and/or control unit 1120 within a warehouse 2000 in the form of an optically visible alarm A.

The interface 1150 is thus furthermore at least configured so as to exchange data between the measurement and/or control unit and a hub 1300 and furthermore or as an alternative thereto with a fire detector and/or extinguishing control hub 3000 and a sprinkler monitoring hub 1300 and furthermore or as an alternative a fire detector and/or extinguishing control hub 3000 and/or a cloud server/operator.

One alternative to this solution is an embodiment in which the measurement and/or control unit 1120 has a communication unit that is configured so as to transmit the data from the measurement and/or control unit 1120 to a further apparatus, in particular a hub and/or a computer and/or a cloud server and/or a mobile terminal. If the data from the measurement and/or control unit 1120 are transmitted for example to the computer and/or cloud server by way of the communication unit, the corresponding comparisons between new values and actual values are performed in these units and an alarm, as described above, is then triggered if certain values are exceeded. The above-described solution may in this case replace a conventional hub such as a sprinkler hub or supplement it by performing certain comparisons and computing operations in the computer and/or cloud server and providing the results to the hub in order to perform appropriate measures, such as for example trigger an alarm. The design of the interface 1150 thus ultimately also depends on the technical unit to which the data are intended to be provided, for example the hub 1300 or the fire detector and/or extinguishing control hub 3000 or cloud server, the cloud or a computer or the like, and the interface is optimized and adapted with regard to the respective requirement and application purpose.

The device 1100 additionally comprises a computer program product 1160 able to be executed by the measurement and/or control unit 1120 and that comprises commands that, when they are executed on a computer: prompt the rotation sensor 1110 to perform a rotational movement (R) about the vertical axis (V) and to differentiate a detected exceedance (Ü) using at least two timestamps TN, TN-1, in particular as a fault message F and a warning message W.

FIG. 2 shows a schematic plan view of a sensor 1110 of a device 1100 for monitoring a storage height in a warehouse 2000 according to the invention, preferably as shown in FIG. 1.

The rotation sensor 1110 is arranged below a ceiling of a warehouse and configured so as to perform a rotational movement (R).

In a first step, the warehouse was surveyed in an exempted state and an initialized distance Di was stored.

During ongoing operation, the rotation sensor 1110 rotates about its vertical axis (V) and in the process performs repeating distance measurements DN, DN-1 during its rotation.

The values of the distance measurement DN, DN-1 obtained in this way are compared with the initialized distance Di.

If the received or current value DN is less than the initialized distance Di, a fault message for an angle of rotation αN is initially present.

This value may furthermore be compared with previous distance measurements DN-1.

If the fault message was already present beforehand, for example one revolution of the rotation sensor beforehand, then it may be concluded that, in an angle of rotation direction αN, a shelf 2200 exhibits erroneous or excessively high loading, that is to say an obstacle H to the firefighting system.

A warning message W is accordingly generated and for example transmitted to a sprinkler monitoring hub.

Figure 3:
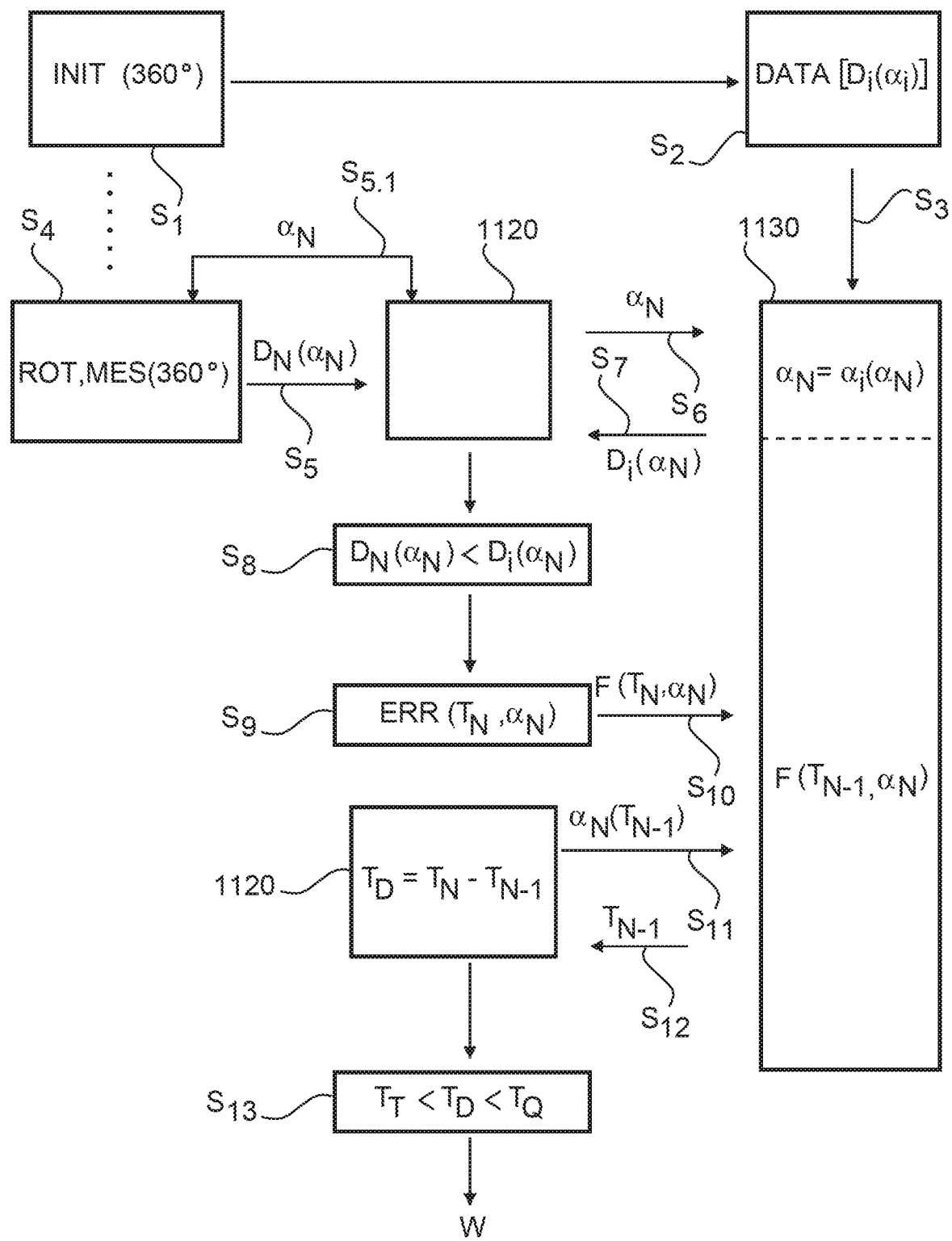

FIG. 3 schematically shows a mode of operation of the measurement and/or control unit of a device for monitoring a storage height according to the invention, as shown preferably in FIG. 1, in particular showing the comparison of two distance measurements DN, DN-1.

The exempted warehouse is first of all surveyed in a first step S1. To this end, the rotation sensor for example rotates once completely through 360° and gathers a corresponding distance Di for each angle of rotation αi.

A corresponding dataset [Di(αi)] is thus obtained, this being indicated by step S2.

The data obtained in this way are then stored in the register 1130, this being indicated by step S3.

Method steps S1 to S3 thus form the actual initialization of the rotation sensor.

The rotation sensor may then be put into regular operation, this being indicated by method step S4. In this case, the rotation sensor rotates about its own axis and surveys the warehouse.

The distances DN(αN) thus received are transmitted to the measurement and/or control unit 1120. This is indicated by method step S5.

In one embodiment, the rotation sensor additionally transmits its angle of rotation αN, and in another embodiment the angle of rotation αN is queried by the measurement and/or control unit 1120 at the rotation sensor or derived from control data. This is indicated by method step S5.1.

The measurement and/or control unit 1120 queries the initialized value αi for the corresponding angle of rotation αN in the register, said initialized value corresponding to the same angle of rotation, that is to say αi(αN). This is indicated by method step S6.

The measurement and/or control unit receives a corresponding distance Di(αN) from the register 1130. This is indicated by method step S7.

The measurement and/or control unit 1120 then compares the measured distance DN(αN) with the initialized value Di(αN). This is indicated by method step S8.

If the measured distance DN(αN) is less than the initialized value Di(αN), a fault is present. This fault is provided with a timestamp. This is indicated by method step S9.

The fault is then stored as a fault message F in the register 1130. This is indicated by method step S10.

The measurement and/or control unit 1120 furthermore checks whether such a fault F (TN, αN) was already present at a previous time TN-1. This is indicated by method step S11.

If this is the case, the corresponding timestamp TN-1 of the previous fault F (TN-1, αN) is queried. This is indicated by method step S12.

The measurement and/or control unit 1120 then decides, on the basis of a warning message criterion, whether it is necessary to output a warning message W that activates a flashing light, for example. By way of example, a time difference TD is determined for this purpose from the two fault messages F (TN, αN) and F (TN-1, αN). This time difference TD is then subsequently compared with a dead time TT and an acknowledgement time TQ. The dead time TT may for example be set to 20 seconds in order to exclude brief measures, and the acknowledgement time TQ may for example be set to 2 hours in order to exclude out-of-date fault messages. This is indicated by method step S13.

If the warning message criterion is met, a warning message (W) is output, by way of which a flashing light in the warehouse is activated, for example. For the case of outputting a warning message (W), said warning message is also stored in the register in order to be able to be verified for a later inspection.

It is however also conceivable for the warning message (W) to be transmitted for example to staff in the warehouse by way of the measurement and/or control unit, preferably comprising coordinates locating the fault. This may be performed for example using the above-described interface, which is preferably designed as a communication unit. The message may in this case for example be transmitted wirelessly to a cloud, a mobile telephone and/or to the operator of the warehouse.

LIST OF UTILIZED REFERENCE NUMBERS

1000 firefighting system
1100 device for monitoring a storage height
1110 rotation sensor
1112 monitoring segment
1120 measurement and/or control unit
1130 register
1140 flashing light
1150 interface
1160 computer program product
1200 sprinkler
1300 hub, in particular sprinkler monitoring hub
2000 warehouse
2100 maximum storage height
2120 predefined maximum storage height
2200 shelf
2210 shelf height
3000 fire detector and/or extinguishing control hub
A alarm
D, $D_i$, $D_N$ distance
$D_i(\alpha i)$, $D_N(\alpha_N)$ distance measurement
$D_i$ initialized distance
$D_{N-1}$ previous distance
$D_N$ current distance
F fault message
H obstacle
R rotational movement
$S_1, S_2, \ldots, S_N$ method steps
$T_N, T_{N-1}$ timestamp
$T_{TOT}$ dead time
$T_{MAX}$ maximum time
Ü exceedance
V vertical axis
W warning message
$\alpha, \alpha_N, \alpha_{N-1}$, angle of rotation

The invention claimed is:

1. A device for monitoring a storage height of a warehouse, comprising:
   a sensor that is designed to be arranged in an upper region of the warehouse, wherein the sensor is configured to perform a distance measurement of a distance that is substantially horizontal with respect to the warehouse and monitor a predefined maximum storage height, and
   a measurement and/or control unit that is configured to output a message in the event of an exceedance of the predefined maximum storage height being detected by the sensor;
   wherein the sensor is a rotation sensor.

2. The device as claimed in claim 1, wherein the rotation sensor is configured to perform a laser distance measurement.

3. The device as claimed in claim 1, wherein the rotation sensor has at least a vertical axis and is configured to perform a rotational movement of at least 90° about the vertical axis.

4. The device as claimed in claim 1, wherein the rotation sensor has at least a vertical axis and is configured to perform a rotational movement about the vertical axis at a predetermined rotational speed, wherein the rotational speed is in the range from 1 to 90 revolutions per minute.

5. A device for monitoring a storage height of a warehouse, comprising:
   a sensor that is designed to be arranged in an upper region of the warehouse, wherein the sensor is configured to perform a distance measurement of a distance that is substantially horizontal with respect to the warehouse and monitor a predefined maximum storage height, and
   a measurement and/or control unit that is configured to output a message in the event of an exceedance of the predefined maximum storage height being detected by the sensor;
   wherein the measurement and/or control unit is coupled to a register, which is configured to store data sensed by the sensor in order to initialize the device for the first time within the warehouse and furthermore or as an alternative to compare a current distance with a previous distance and furthermore or as an alternative with an initialized distance.

6. The device as claimed in claim 1, wherein the measurement and/or control unit is coupled to a register, which is configured to store data sensed by the sensor in order to initialize the device for the first time within the warehouse and furthermore or as an alternative to compare a current distance with a previous distance and furthermore or as an alternative with an initialized distance.

7. The device as claimed in claim 1, furthermore comprising:
   a computer program product able to be executed by the measurement and/or control unit and that comprises commands that, when they are executed on a computer:
   prompt the sensor to perform the distance measurement, and
   differentiate a detected exceedance using at least two timestamps including a fault message and a warning message.

8. The device as claimed in claim 5, wherein the measurement and/or control unit is furthermore configured to provide a timestamp associated with the message in the event of an exceedance of the predefined maximum storage height being detected by the sensor.

9. The device as claimed in claim 5, wherein the measurement and/or control unit is furthermore configured to trigger an alarm by the register including an optical alarm unit present in the warehouse, and/or to output a signal.

10. The device as claimed in claim 5, furthermore comprising: an optical alarm unit including a flashing light that is configured to output a warning message from the measurement and/or control unit within the warehouse in the form of an optically visible alarm.

11. The device as claimed in claim 5, wherein the measurement and/or control unit comprises a communication unit that is configured to transmit data to a further apparatus comprising a hub and/or a computer and/or a cloud server and/or a mobile terminal.

12. A firefighting system including a water extinguishing system for a warehouse, comprising an extinguishing fluid outlet including a nozzle and/or a sprinkler, and a device as claimed in claim 5.

13. The firefighting system as claimed in claim 12, furthermore comprising:
   a sprinkler monitoring hub and/or a fire detector and/or extinguishing control hub and/or a fault message hub that is connected to the device in order to trigger an alarm by a flashing light.

14. A hub of a firefighting system as claimed in claim 12, wherein the hub includes a sprinkler monitoring hub and/or a fire detector and/or extinguishing control hub and/or a fault message hub, and the device is configured to trigger an alarm including a fault or warning.

15. The device as claimed in claim 5, wherein the sensor is configured to perform a laser distance measurement.

16. The device as claimed in claim 5, wherein the sensor is a rotation sensor.

17. A device for monitoring a storage height of a warehouse, comprising:
   a sensor that is designed to be arranged in an upper region of the warehouse, wherein the sensor is configured to perform a distance measurement of a distance that is substantially horizontal with respect to the warehouse and monitor a predefined maximum storage height,
   a measurement and/or control unit that is configured to output a message in the event of an exceedance of the predefined maximum storage height being detected by the sensor; and
   a computer program product able to be executed by the measurement and/or control unit and that comprises commands that, when they are executed on a computer:
   prompt the sensor to perform the distance measurement, and
   differentiate a detected exceedance using at least two timestamps including a fault message and a warning message.

18. The device as claimed in claim 5, furthermore comprising:
   a computer program product able to be executed by the measurement and/or control unit and that comprises commands that, when they are executed on a computer:
   prompt the sensor to perform the distance measurement, and
   differentiate a detected exceedance using at least two timestamps including a fault message and a warning message.

19. The device as claimed in claim 17, wherein the sensor is configured to perform a laser distance measurement.

20. The device as claimed in claim 17, wherein the sensor is a rotation sensor.

21. The device as claimed in claim 17, wherein the measurement and/or control unit is coupled to a register, which is configured to store data sensed by the sensor in order to initialize the device for the first time within the warehouse and furthermore or as an alternative to compare a current distance with a previous distance and furthermore or as an alternative with an initialized distance.

\* \* \* \* \*